June 28, 1966  H. J. FERRIS  3,258,270
FLAIL TYPE MATERIAL SPREADER WITH AXIALLY ROTATABLE CONTAINER
Filed Nov. 12, 1963  2 Sheets-Sheet 2
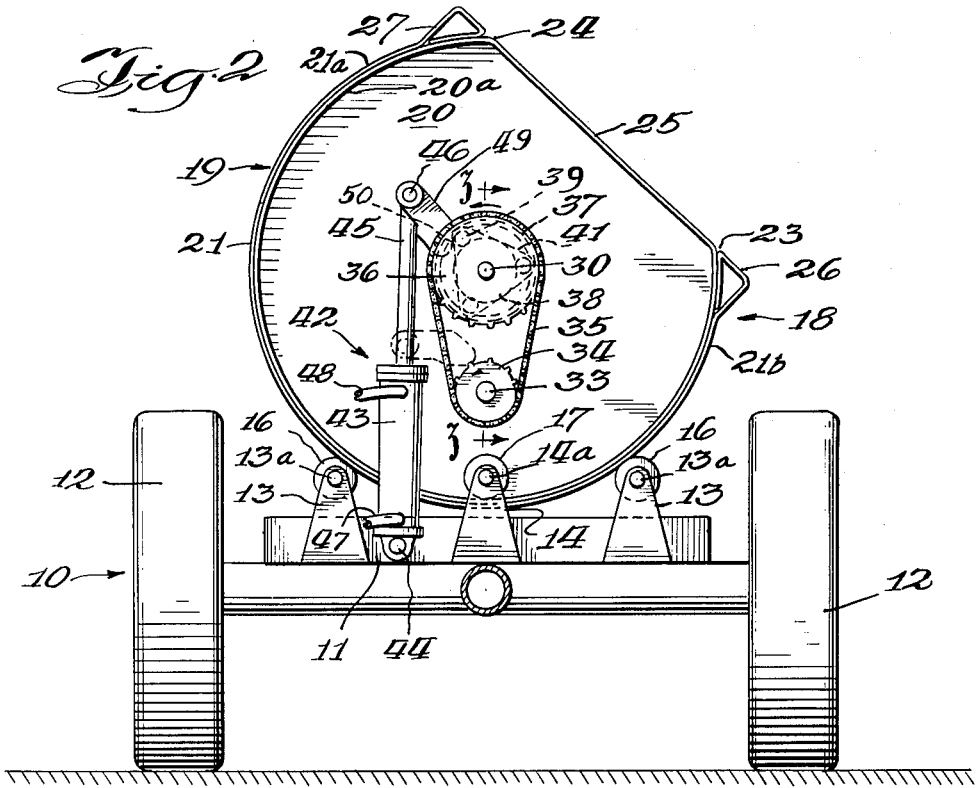
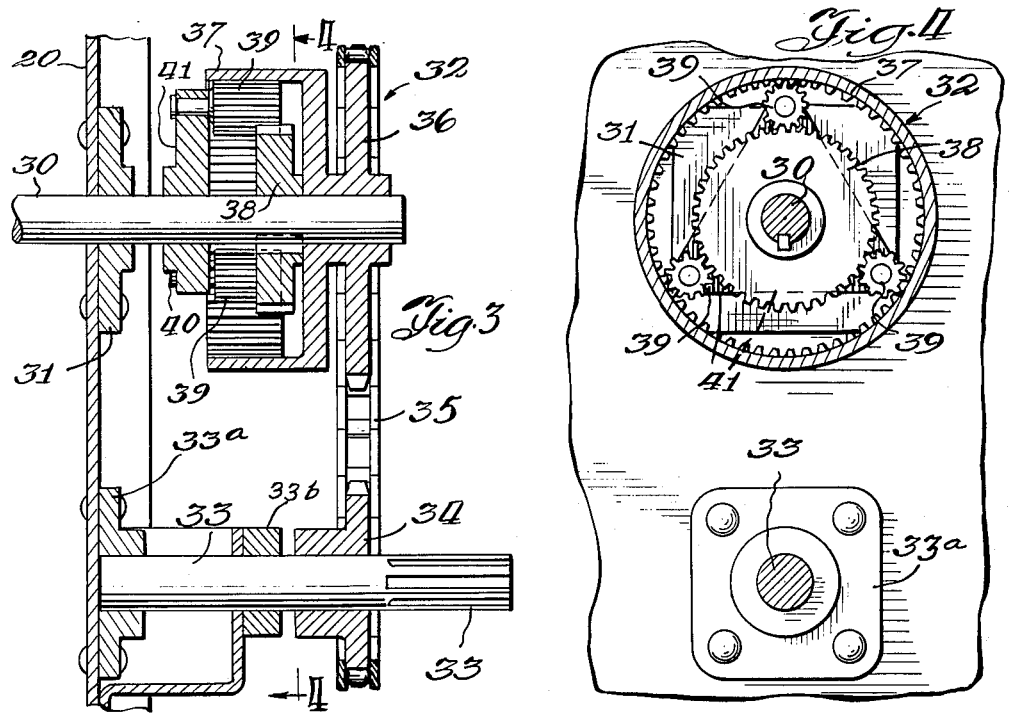
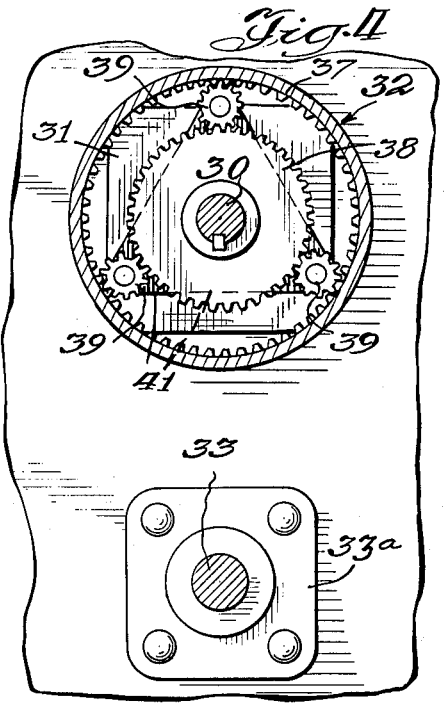

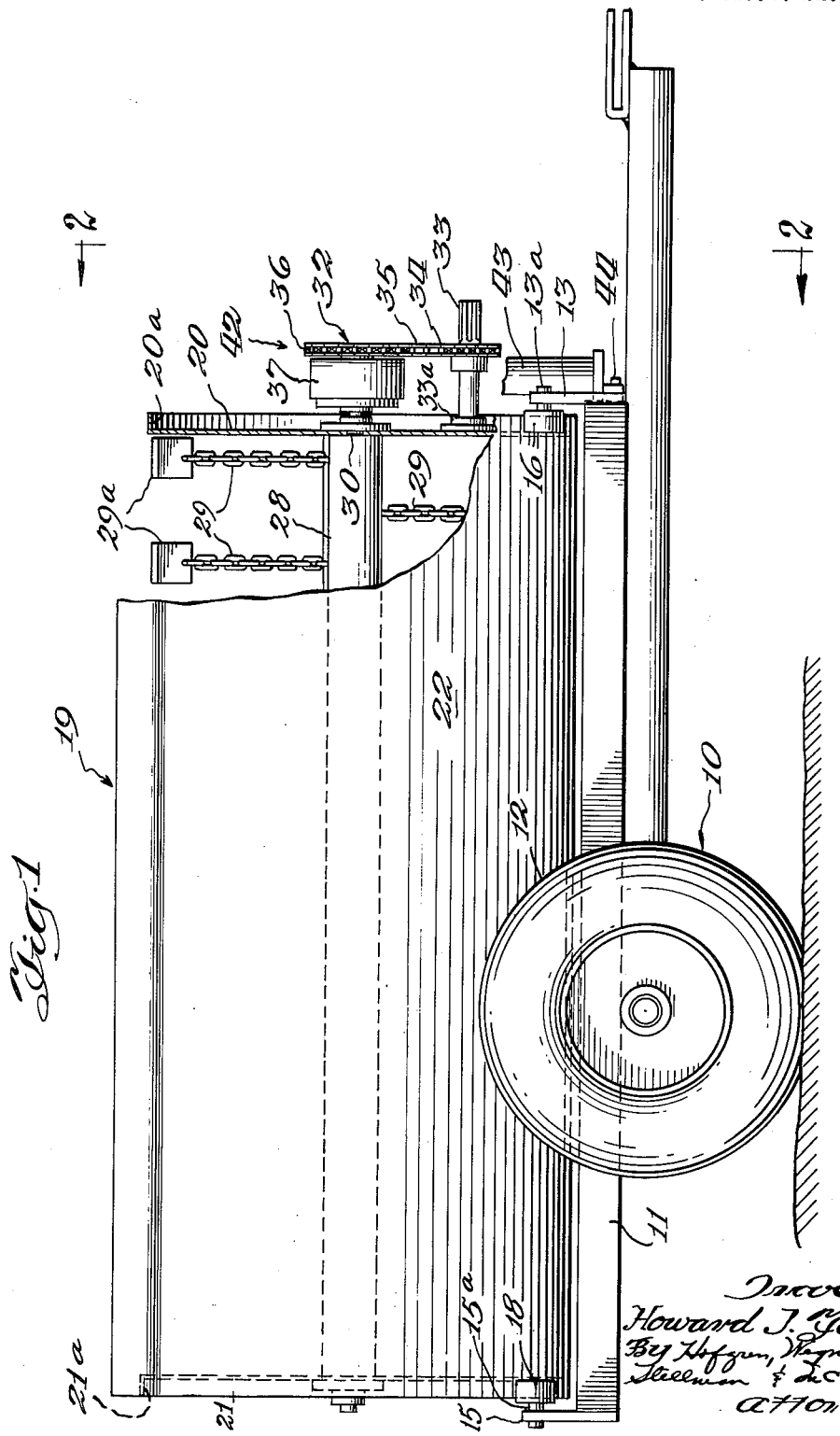

United States Patent Office 3,258,270
Patented June 28, 1966

3,258,270
FLAIL TYPE MATERIAL SPREADER WITH AXIALLY ROTATABLE CONTAINER
Howard J. Ferris, Gulfport, Fla., assignor to Starline, Inc., a corporation of Illinois
Filed Nov. 12, 1963, Ser. No. 322,971
13 Claims. (Cl. 275—3)

This invention relates to a flail type material spreader, and in particular it relates to a side unloading flail type spreader which may be readily adjusted to be loaded from either side and to spread material toward either side of the path of travel of the device regardless of the side from which it was loaded.

Flail type material spreaders, and especially those which spread material to one side of the path of travel of the spreader, will operate successfully with a great variety of materials and under a wide variety of different operating conditions. Nevertheless, there are certain problems connected with the use of such spreaders, and it is the principal object of the present invention to eliminate one such problem.

Side delivery, flail type material spreaders as now manufactured and sold are able to discharge material only to the right of the path of travel, because they are driven from a tractor power take-off which commonly is not reversible; but more importantly, because the material container itself requires a hood that extends to a line substantially vertically above the discharge shaft and guides material to one side of the path of travel. Accordingly, even if the tractor were equipped with a reversible power take-off it would be necessary to change the orientation of the discharge opening of the container with respect to the path of travel of the device in order to spread material to the left of the path of travel.

Furthermore, a side delivery spreader is somewhat unsatisfactory to load because of the hood, and consequently the present commercial side delivery spreaders have a hood the upper portion of which is in the form of a hinged cover member which permits the size of the opening to be increased for loading.

Another problem with respect to the loading of side delivery spreaders is that many barns, or other animal enclosures from which manure must be removed, are so positioned with reference to other structures that a tractor may approach them only from one direction; so a conventional, commercially available side delivery spreader cannot be used on some farms at all.

In accordance with the present invention, the container of a side delivery spreader is mounted on a frame, or chassis in such a way that the container may be rotated about the axis of the discharge shaft so that it opens either toward the right or the left of the chassis, and at the same time the drive for the unloader shaft is provided with a simple reversing mechanism so that the unloader shaft is always rotated in a direction that causes the flails to approach the discharge opening from above.

The present construction permits the container to be positioned in the most convenient way for loading, and then to be unloaded with the container in the same positioner or in its opposite orientation. Obviously there are certain field conditions where it is necessary to discharge the material to a particular side of the path of travel of the spreader, and accordingly the rotational adjustment of the container is extremely helpful both in loading the container and in spreading material from the container.

Furthermore, the way in which angular adjustment of the discharge opening is obtained in the device of the present invention permits the container to be adjusted with the opening straight up, which also facilitates loading the container.

The invention is illustrated in a preferred embodiment in the accompanying drawings, in which:

FIG. 1 is a side elevational view of a material spreader with parts broken away for clarity of illustration;

FIG. 2 is a front elevational view taken substantially as illustrated along the line 2—2 of FIG. 1, with a reversing drive control cam shown in full lines in position to discharge with the container as shown, and in broken lines in position to discharge to the opposite side;

FIG. 3 is a fragmentary section on an enlarged scale taken substantially as illustrated along the line 3—3 of FIG. 2; and FIG. 4 is a fragmentary section taken substantially as illustrated along the line 4—4 of FIG. 3.

Referring to the drawings in greater detail, and referring first to FIGS. 1 and 2, a chassis, indicated generally at 10, has a frame 11 provided with wheels 12, and a hitch tongue 13 extends forwardly from the frame. At the front of the frame are upstanding support brackets 13 and a central guide bracket 14; and at the rear of the frame are support brackets 15 which are identical with the brackets 13 and a central guide bracket (not shown) which is identical with the front guide bracket 14. At the upper ends of the various brackets are stub shafts 13a, 14a and 15a, respectively, with the shafts 13a and 15a journaling supporting rollers 16 and 18, and the shaft 14a journaling a guide roller 17. A guide roller similar to 17 is located in identical position at the rear of the frame 11.

A container, indicated generally at 19, includes a front wall 20 and a rear wall 21 which are provided, respectively, with out-turned flanges 20a and 21a. An arcuate body panel 22 is secured around the flanges 20a and 21a, and the margins 23 and 24 of the panel 22, together with straight portions 25 of the two end panels, define a rectangular discharge opening which occupies approximately 90° of the circumference of the container. Triangular stiffening members 26 and 27 extend along the marginal portions of the body panel.

The container 19 has its opposite end flanges 20a and 21a supported on the rollers 16 and 18; and the roller 17, together with the corresponding roller at the rear of the device, overlie the respective end flanges 20a and 21a to retain the container in place on the rollers 16 and 18. Thus, the container may be turned on the rollers 16 and 18 so as to adjust the location of the discharge opening.

Journaled in the end panels 20 and 21 is a discharge shaft or rotor 28 secured to which are flail chains 29 having flail plates 29a. Said flail chains 29, or other equivalent flexible flail members, are secured at regularly spaced intervals along the entire length of the discharge shaft 28.

Referring now especially to FIGS. 3 and 4, the rotor 28 has a reduced forward end portion 30 that extends through a bearing 31 in the front end wall 20, and reversible power transmission means, indicated generally at 32, is mounted on the projecting portion of the shaft 30.

An input shaft 33 is journalled in bearings 33a and 33b; and input of power to the unloader shaft 28 is by connecting the power take-off of a tractor to the shaft 33. A sprocket 34 is keyed on shaft 33, and a chain 35 trained on said sprocket also extends around a sprocket 36 that is journaled on the forward portion of the shaft 30 to drive the reversible power transmission means 32. Formed integrally with the sprocket 36 is a ring gear 37. A drive pinion 38 is keyed to the shaft 30 within the ring gear 37, and a driving connection between the ring gear 37 and the pinion 38 is by means of three planetary gears 39 that are journaled on stub shafts 40 of a triangular spider 41 that is journaled on the shaft 30 between the ring gear and the wall 20.

Referring to FIG. 2, it is apparent that, if the spider 41 is free to rotate counterclockwise, rotation of the ring gear 37 will produce counterclockwise rotation of the pinion 38; while conversely, if the spider 41 is locked against rotation then counterclockwise rotation of the ring gear 37 will result in clockwise rotation of the pinion 38.

Rotation of the container 19 upon the supporting rollers is afforded by a hydraulic cylinder and piston, indicated generally at 42, there being a cylinder 43 that is pivotally mounted at 44 on the frame 11, and a piston rod 45 that is pivotally connected at 46 to the front wall 20 of the container. Hydraulic lines 47 and 48 connect the cylinder 43 to the tractor hydraulic system, so that the piston and piston rod 45 may be either extended as illustrated in FIG. 2, or moved to a retracted position (not shown) in order to change the location of the container discharge opening by an angle of about 90°.

In one limit position the wall margin 23 is seen to be substantially in the horizontal median plane of the container and the margin 24 is substantially in the vertical median plane of the container; while in the other limit position the margin 23 is substantially in the vertical median plane and the margin 24 is substantially in the horizontal median plane.

In each limit position the portion of the wall 21 which is above the horizontal median plane—i.e., either the portion 21a or the portion 21b—acts as an integral material directing hood.

By providing a manual control valve which is within reach of a tractor operator, the position of the container opening may be adjusted by the driver without leaving the tractor seat. Conventional tractor hydraulic system valves may be held open until a device which is under control of the system has reached any desired position. Thus, the piston may be stopped at any point in its travel, and the container 19 may be positioned with the margins 23 and 24 of the discharge opening substantially in the same horizontal plane so that the container opens straight up for easy loading.

Control of the reversing drive 32 is by means of a cam 49 that is pivotally mounted on the piston and pivot 46 and has a surface 50 that bears on a side of the planetary gear spider 41 to lock the spider against counterclockwise rotation when the piston rod 45 is extended. Retraction of the piston rod to reverse the container moves the cam 49 to the broken line position of FIG. 2, where it rests on top of the cylinder 43 and leaves the spider free.

The foregoing detailed description is given for clearness of understanding only and no unecessary limitations should be understood therefrom, as modifications will be obvious to those skilled in the art.

I claim:

1. A material spreader comprising: a wheeled carriage; a generally cylindrical container, said container having front and rear end walls and a longitudinal wall that has generally parallel first and second margins which define a discharge opening extending around approximately 90° of its circumference; an unloader shaft on the longitudinal axis of the container; flexible flails spaced along said shaft to fling material laterally from the container through said opening when the shaft is rotated; means mounting the container on the carriage for rotation about said longitudinal axis to vary the position of the opening; adjusting means movable between first and second limit positions and connected to the container to rotate the latter on its axis between a first limit position in which the first margin of the longitudinal wall is substantially in the horizontal median plane of the container and the second margin of said wall is substantially in the vertical median plane of the container so as to position the discharge opening on one side of the longitudinal vertical median plane of the container and a second limit position in which said first margin is substantially in said vertical median plane and said second margin is substantially in said horizontal median plane so as to position said opening on the other side of said vertical plane, the portion of said longitudinal wall which is above the horizontal median plane in each limit position providing an integral material directing hood; and reversible power transmission means on an end wall of the container, whereby the unloader shaft may be caused to rotate so that the flails approach the discharge opening from above in either position of said opening.

2. The device of claim 1 in which the adjusting means comprises hydraulic cylinder and piston means having one of its ends pivotally connected to the carriage and its other end pivotally connected to an end of the container in such a way that movement of the piston between extended and retracted positions adjusts the container between its first and second limit positions.

3. The device of claim 2 in which the container may be oriented in any position between its limit positions.

4. A material spreader, comprising: a wheeled carriage; a generally cylindrical container, said container having front and rear end walls and a longitudinal wall that has generally parallel first and second margins which define a discharge opening extending around no more than about 90° of its circumference; an unloader shaft on the longitudinal axis of the container; flexible flails spaced along said shaft to fling material laterally from the container through said opening when the shaft is rotated; means mounting the container on the carriage for rotation about said longitudinal axis to vary the position of the opening; adjusting means movable to any desired point between first and second limit positions and connected to the container to rotate the latter on its axis between a transport position with the discharge opening substantially bisected by the longitudinal vertical median plane of the container, a first limit position in which the first margin of the longitudinal wall is substantially in the horizontal median plane of the container and the second margin of said wall is substantially in the vertical median plane of the container so as to position the opening substantially entirely on one side of said vertical plane, and a second limit position in which said first margin is substantially in said vertical median plane and said second margin is substantially in said horizontal median plane so as to position the opening substantially entirely on the other side of said vertical plane, the portion of said longitudinal wall which is above the horizontal median plane in each limit position providing an integral material directing hood; and reversible power transmission means on an end wall of the container, whereby the unloader shaft may be caused to rotate so that the flails approach the discharge opening from above when the opening is not in said bisecter position.

5. The device of claim 4 in which the adjusting means comprises hydraulic cylinder and piston means having one of its ends pivotally connected to the carriage and its other end pivotally connected to an end of the container in such a way that movement of the piston between extended and retracted positions adjusts the container between its first and second limit positions.

6. A material spreader comprising: a wheeled carriage; a generally cylindrical container, said container having front and rear end walls and a longitudinal wall that has a discharge opening extending around approximately 90° of its circumference; an unloader shaft on the longitudinal axis of the container; flexible flails spaced along said shaft to fling material laterally from the container through said opening when the shaft is rotated; means mounting the container on the carriage for rotation about said longitudinal axis to vary the position of the opening; adjusting means movable between first and second limit positions and connected to the container to rotate the latter on its axis between a first limit position in which the discharge opening is on one side of the longitudinal vertical median plane of the container and a second limit position in which said opening is on the other side of said plane; and reversible power transmission means on end wall of the container, whereby the unloader shaft may be caused to rotate so that the flails approach the discharge opening from above in either position of said opening, said reversible power transmission means including an input shaft driven always in one direction, means providing a driving connection between the input shaft and the unloader shaft, and reversing drive control means operated by movement of the adjusting means between its limit positions to reverse the direction of rotation of a part of said driving connection and thus reverse the rotation of said unloader shaft.

7. The device of claim 6 in which the driving connection means includes a ring gear journaled on the unloader shaft, a spur gear keyed to said shaft, a floating spider journaled on the unloader shaft, a plurality of gears on said spider engaged with the ring gear and the spur gear, and the reversing drive control means selectively locks said spider against rotation or permits it to rotate.

8. The device of claim 7 in which the reversing drive control means comprises a member on the movable adjusting means that abuts the spider in the first limit position of the adjusting means and is spaced from the spider in the second limit position of the adjusting means.

9. The device of claim 6 in which the adjusting means comprises hydraulic cylinder and piston means having one of its end pivotally connected to the carriage and its other end pivotally connected to an end of the container in such a way that movement of the piston between extended and retracted positions adjusts the container between its first and second limit positions.

10. The device of claim 9 in which the driving connection means includes a ring gear journaled on the unloader shaft, a spur gear keyed to said shaft, a floating spider journaled on the unloader shaft, a plurality of gears on the spider engaged with the ring gear and the spur gear, and in which the reversing drive control member is a pivoted cam that abuts the spider in the extended position of the piston and is spaced from the spider in the retracted position of the piston.

11. A material spreader, comprising: a wheeled carriage; a generally cylindrical container, said container having front and rear end walls and a longitudinal wall that has a discharge opening extending around no more than about 90° of its circumference; an unloader shaft on the longitudinal axis of the container; flexible flails spaced along said shaft to fling material laterally from the container through said opening when the shaft is rotated; means mounting the container on the carriage for rotation about said longitudinal axis to vary the position of the opening; adjusting means movable to any desired point between first and second limit positions and connected to the container to rotate the latter on its axis between a transport position with the discharge opening substantially bisected by the longitudinal vertical median plane of the container, a first limit position in which the opening is substantially entirely on one side of said plane, and a second limit position in which the opening is substantially entirely on the other side of said plane; and reversible power transmission means on an end wall of the container, whereby the unloader shaft may be caused to rotate so that the flails approach the discharge opening from above when the opening is not in said bisected position, said reversible power transmission means including an input shaft driven always in one direction, means providing a driving connection between the input shaft and the unloader shaft, and a reversing drive control means operated by movement of the adjusting means between its limit positions to reverse the direction of rotation of a part of said driving connection and thus reverse the rotation of said unloader shaft.

12. The device of claim 11 in which the driving connection means includes a ring gear journaled on the unloader shaft, a spur gear keyed to said shaft, a floating spider journaled on the unloader shaft, a plurality of gears on said spider engaged with the ring gear and the spur gear, and the reversing drive control means selectively locks said spider against rotation or permits it to rotate.

13. The device of claim 12 in which the reversing drive control means comprises a member on the movable adjusting means that abuts the spider in the first limit position of the adjusting means and is spaced from the spider in the second limit position of the adjusting means.

References Cited by the Examiner

UNITED STATES PATENTS

| 757,279 | 4/1904 | Depew | 298—18 |
|---|---|---|---|
| 1,103,314 | 7/1914 | Rhodes | 105—265 |
| 2,900,193 | 8/1959 | Harriott | 275—3 |
| 2,952,465 | 9/1960 | Skromme | 275—3 |
| 3,121,568 | 2/1964 | Wilkes et al. | 275—3 |

FOREIGN PATENTS 252,943   10/1948   Switzerland.

ANTONIO F. GUIDA, *Acting Primary Examiner.*

ABRAHAM G. STONE, *Examiner.*

W. A. SMITH, *Assistant Examiner.*